(12) United States Patent
Powell

(10) Patent No.: US 7,614,586 B2
(45) Date of Patent: Nov. 10, 2009

(54) METHOD OF TRAVELING TO EARTH'S ORBIT USING LIGHTER THAN AIR VEHICLES

(76) Inventor: John Marchel Powell, 2530 Mercantile Dr., Ste. I, Rancho Cordova, CA (US) 95742

( * ) Notice: Subject to any disclaimer, the term of this patent is extended or adjusted under 35 U.S.C. 154(b) by 511 days.

(21) Appl. No.: 11/372,525

(22) Filed: Mar. 10, 2006

(65) Prior Publication Data

US 2007/0029448 A1 Feb. 8, 2007

Related U.S. Application Data

(60) Provisional application No. 60/660,796, filed on Mar. 10, 2005.

(51) Int. Cl.
*B64G 1/00* (2006.01)
(52) U.S. Cl. .................................................. 244/158.3
(58) Field of Classification Search .............. 244/158.1, 244/158.3, 30, 31, 158.9, 159.2, 172.4, 172.2
See application file for complete search history.

(56) References Cited

U.S. PATENT DOCUMENTS

| | | | | |
|---|---|---|---|---|
| 3,104,079 A | * | 9/1963 | Phillips | 244/159.3 |
| 3,174,705 A | * | 3/1965 | Slocum, Jr. et al. | 244/171.1 |
| 5,305,970 A | * | 4/1994 | Porter et al. | 244/172.2 |
| 6,119,983 A | * | 9/2000 | Provitola | 244/171.3 |
| 6,364,252 B1 | * | 4/2002 | Anderman | 244/158.6 |
| 6,471,159 B1 | * | 10/2002 | Bundo | 244/26 |
| 7,108,228 B1 | * | 9/2006 | Marshall | 244/158.1 |
| 7,131,613 B2 | * | 11/2006 | Kelly | 244/171.4 |

* cited by examiner

*Primary Examiner*—Tien Dinh
(74) *Attorney, Agent, or Firm*—Heisler & Associates

(57) ABSTRACT

A method for transporting people and cargo from the surface of the Earth to orbit around the Earth is disclosed. The present invention uses a series of lighter-than-air vehicles to allow for a far safer and less strenuous trip to orbit than using current rocket-based technology. The high altitude atmospheric airship is flown from the ground to the upper atmosphere, where it docks with the buoyant transfer station, and from there, the people and cargo transfer to an orbital airship for the remainder of the trip to orbit. The orbital airship returns to the station for another transfer back to the atmospheric airship for the return back to the surface of Earth.

2 Claims, 4 Drawing Sheets

METHOD OF TRAVELING TO EARTH'S ORBIT USING LIGHTER THAN AIR VEHICLES

CROSS-REFERENCE TO RELATED APPLICATIONS

This application claims the benefit of Provisional Patent Application No. 60/660,796 filed Mar. 10, 2005.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to an improved method of traveling to and from orbit around the Earth by means of a series of lighter-than-air vehicles.

All current methods of reaching orbit around the Earth involve chemical rockets launched from the ground. This method subjects the passengers and cargo to high forces. Rockets are also exceedingly dangerous. When there is a problem with a rocket, there is often only a fraction of a second to correct the problem before disaster. Cargo to be flown aboard rockets must be specially strengthened in order to survive. The people flying aboard rockets must specially selected for physical stamina and fitness and even after that, they must be trained in order to handle the stresses of such travel.

Slowly accelerating airships are the solution to both of these problems. Passengers and cargo are not exposed to high forces or loads. This invention takes days to reach orbit as opposed to minutes with conventional rockets. The safety advantage is immense. Instead of fractions of a second to correct problems this invention could take hours or even days to correct a problem without endangering passengers or cargo.

DESCRIPTION OF PRIOR ART

Prior art of airships include airship designs for flight to 100,000 feet. However, no known prior art has been found for use of lighter-than-air vehicles or semi-lighter-than-air (hybrid) vehicles for flight to space.

Additional new methods currently being proposed all involve rockets, or rocketplanes being launched from an airplane. Although the aircraft portion of the flight reduced the forces and dangers to passengers and cargo during this portion of the flight, a rocket is still used for the remainder of the trip.

The prior art of patent application 20050269441 only relates to a vehicle that travels from the ground to 100,000 feet. That invention cannot be utilized in a system for flight to orbit. Patent application 20050269441 describes an airship with a single upswept wing. Both of the winged airships described in this invention use two highly swept wings.

The prior art of patent application 20050258306 also only relates to a vehicle that travels from the ground to 100,000 feet. That invention also cannot be utilized in a system for flight to orbit. Patent application 20050258306 describes an airship with a low aspect ratio delta wing. Both of the winged airships described in this invention use two high aspect ration wings.

BRIEF SUMMARY OF THE INVENTION

It has now been found that the objectives described above can be achieved by utilizing lighter-than-air technology. Using slowly accelerating airships, the safety and the reduction of undesirable forces involved in the flight to orbit is greatly improved.

However, flying an airship directly from the ground to orbit is not currently possible. An airship large enough to reach orbit would not survive the winds near the surface of the Earth. Conversely, an airship that could fly from the ground to the upper atmosphere would not be light enough to reach space. In order to overcome these problems, a minimum three-part architecture is used. This method allows the utilization of lighter-than-air technology to reach space.

The first vehicle is an atmospheric airship. This airship carries people and cargo from the surface of the Earth to the upper atmosphere to roughly between 90,000 and 140,000 feet. Propellers designed to operate in near vacuum drive the airship. The airship contains a docking mechanism for connecting with and transferring people and cargo to a buoyant transfer station.

The second vehicle is a buoyant transfer station and docking facility. This vehicle stays in the upper atmosphere at between roughly 90,000 to 140,000 feet above the Earth's surface for extended periods of time. The facility acts as the "way station" to orbit. This vehicle is both the destination and the departure port of both the atmospheric airship and the orbital airship. It can also serve as a research center, construction site and tourist destination.

The buoyant transfer station's general configuration consists of several cylindrical arms radiating out from a common center.

The third vehicle is a combination of airship and dynamic vehicle that flies directly to orbit from the docking station. The vehicle is generally shaped like the letter "V." It flies with the apex of the "V" pointed forward. The cross-sections of the arms of the "V" are airfoil cross-sections. In order to utilize the few molecules of gas at extreme altitudes, this craft is extremely large.

This airship uses buoyancy to climb to an altitude above the buoyant transfer station. From there, it uses chemical or electric propulsion, or a combination of both, to slowly accelerate. As the vehicle accelerates, it dynamically climbs using the shape of the vehicle as an airfoil. By climbing, the vehicle travels into lower density air, thus reducing aerodynamic drag. Over several days it reaches orbital velocity, and an altitude between 330,000 and 550,000 feet.

The atmospheric drag at orbital altitude is sufficiently high that orbit velocity cannot be maintained without use of the vehicle propulsion system. Reentry into the Earth's atmosphere is accomplished by turning off the propulsion system. Atmospheric drag then decelerates the vehicle to below the velocity require in order to maintain orbit. As the vehicle reenters the atmosphere, the propulsion system is used to limit the decent rate, thus keeping reentry heating to a minimum.

DETAILED DESCRIPTION OF THE INVENTION

Figure 1:
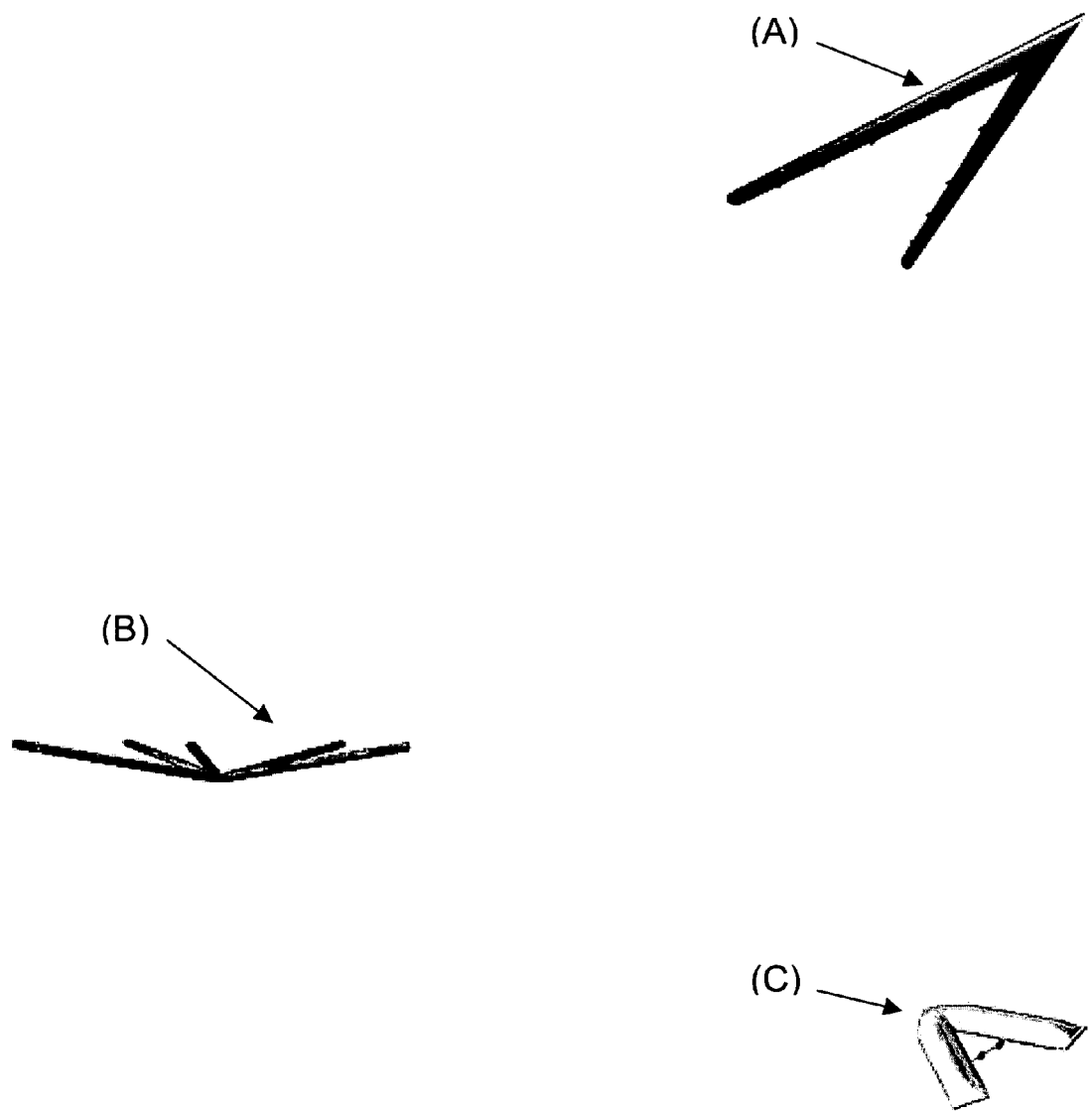
FIG. 1 depicts the three-part method of the present invention for traveling from the Earth to orbit, showing the orbital airship, the buoyant transfer station and docking facility, and the high altitude atmospheric airship.

The utilization of three lighter-than-air vehicles together to reach altitudes above 300,000 feet, reaching orbit around the Earth, is illustrated in FIG. 1.

Figure 4:
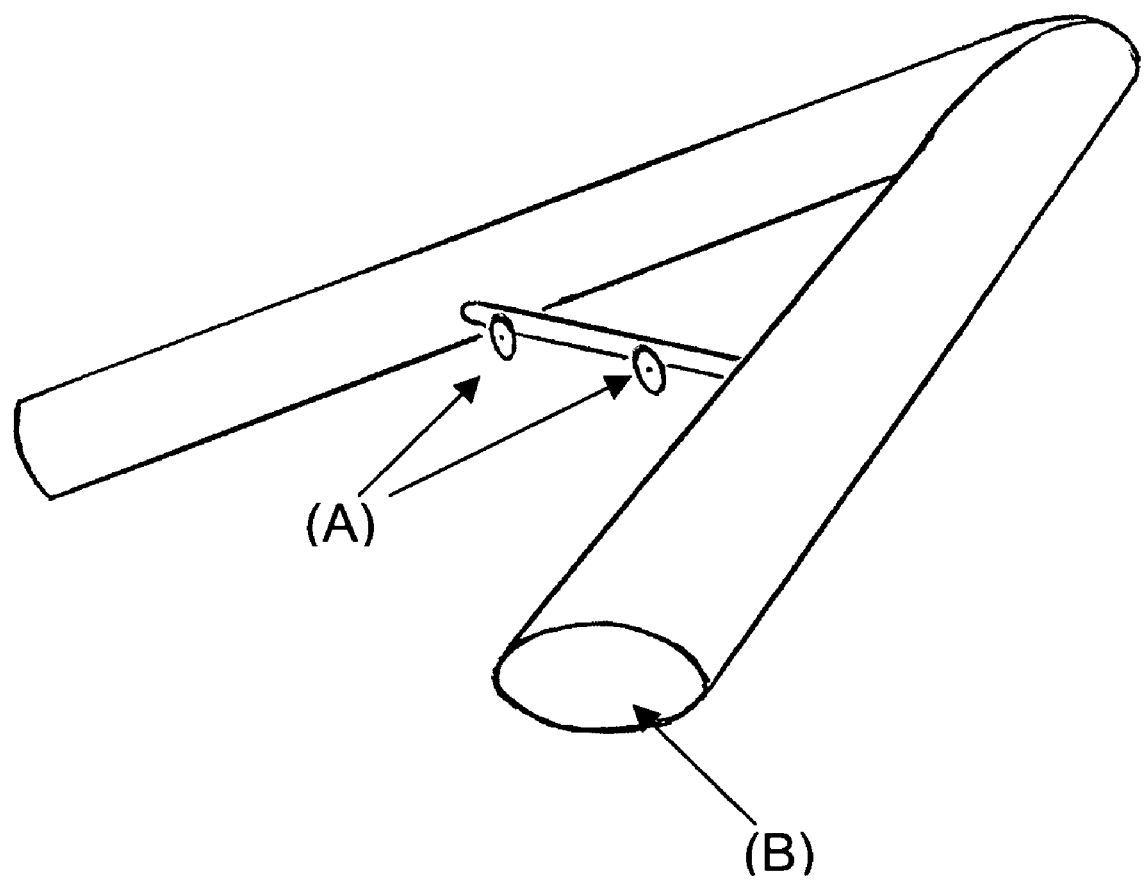
FIG. 4 is a detail of the high altitude atmospheric airship of the present invention.

The first vehicle, FIG. 1(C), is an airship consisting of two highly swept back arms forming, when viewed from above, the letter "V" as shown in FIG. 4. The following additional embodiments apply to the first vehicle:

Another embodiment of the present invention may provide a lifting gas pumping system for attitude control. This system may consist of pumps along the tops of the inner lifting gas cells within the inflated outer shell.

Another embodiment of the present invention may provide a crew capsule contained within the inflated shell.

Another embodiment of the present invention may provide a cross-section shape of the wings that are that of a subsonic airfoil. The wing portion is shown in FIG. 4(B).

The airship consists of the following: an outer inflated shell, multiple inner lifting gas cells, a carbon fiber keel contained within the inflated shell, a crew capsule contained within the inflated shell, a docking mechanism, two electric motors each driving a two bladed propeller, as represented by FIG. 4(A).

Figure 3:
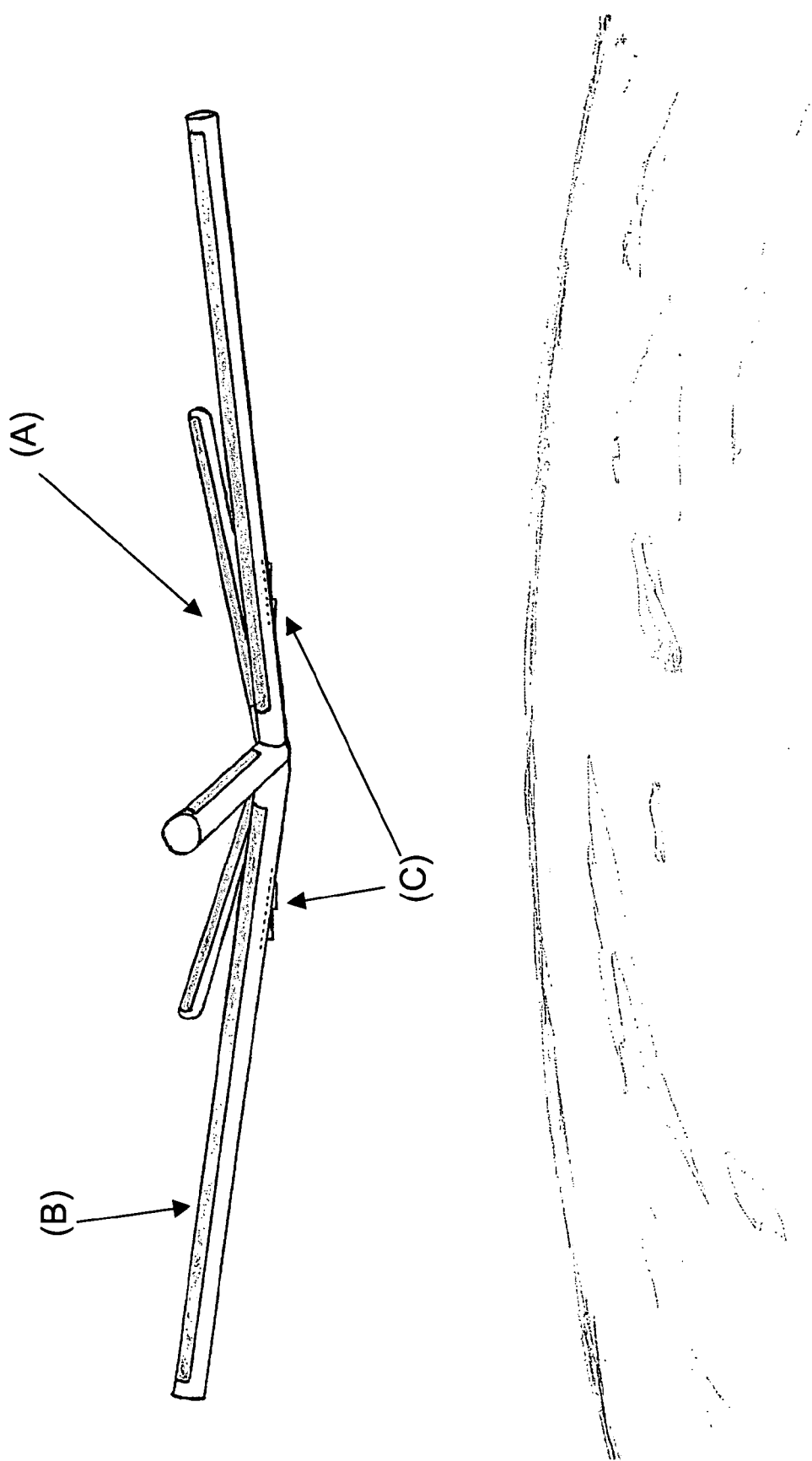
FIG. 3 is a detail side view of the buoyant transfer station and docking facility of the present invention.

The second vehicle, shown by FIG. 1(B), is a buoyant transfer station and docking facility. These additional embodiments apply to the second vehicle:

Another embodiment of the present invention may provide five large inflated cylinders radiating out from a central hub as shown in FIG. 3(A).

Another embodiment of the present invention may provide that each lifting cylinder contains: an outer inflated shell, multiple inner lifting gas cells, and a carbon fiber keel contained within the inflated shell.

Another embodiment of the present invention may provide a crew capsule contained within the inflated shell.

Another embodiment of the present invention may provide solar power generation panels mounted on the exterior of the inflated shell as seen in FIG. 3(B).

Another embodiment of the present invention may provide that two of the lifting cylinders contain a docking mechanism, as illustrated in FIG. 3(C).

Figure 2:
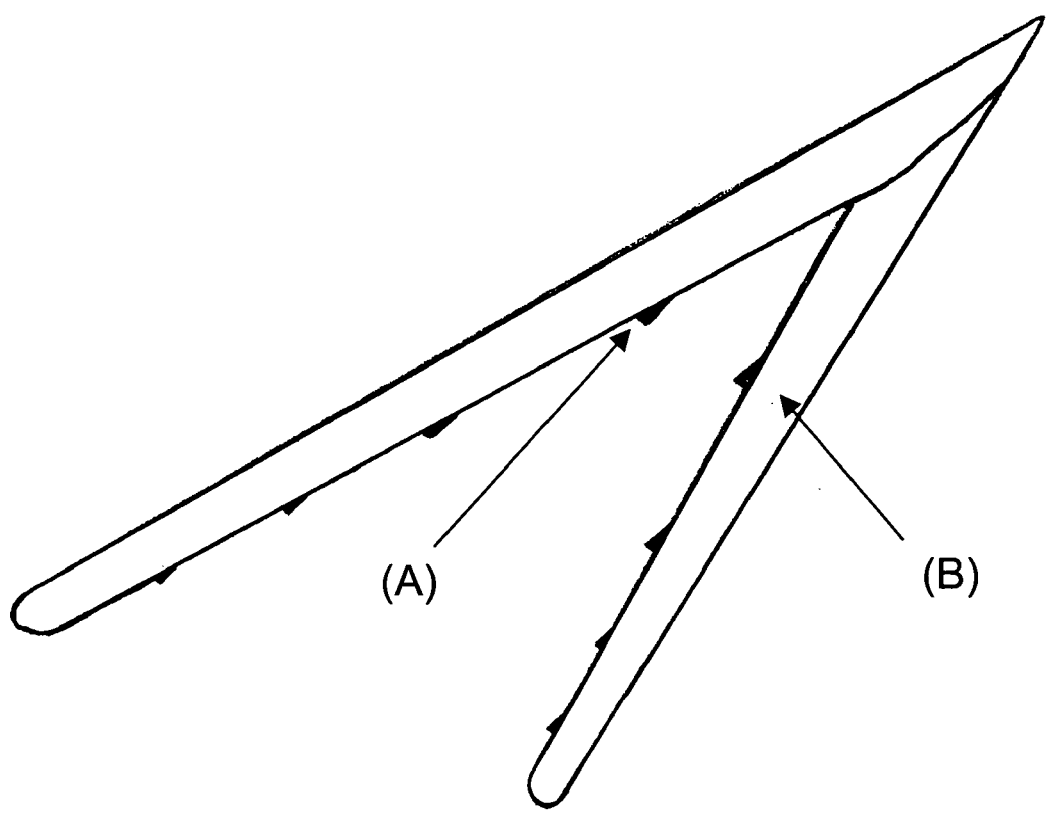
FIG. 2 is the orbital airship detail, perspective view, of the present invention.

The third vehicle is an orbital airship, seen in FIG. 1(A). This portion of the invention consists of two highly swept back arms forming, when viewed from above, the letter "V." These additional embodiments apply to the third vehicle:

Another embodiment of the present invention may provide highly swept high aspect ratio wings, depicted by FIG. 2(B).

Another embodiment of the present invention may provide an inflated outer shell consisting of ripstop polyethylene that is coated with a thin, electrostatically-deposited ceramic film.

Another embodiment of the present invention may provide for multiple inner lifting gas cells.

Another embodiment of the present invention may provide a carbon fiber keel contained within the inflated shell.

Another embodiment of the present invention may provide a cross section shape of the wings which are that of an hypersonic airfoil.

Another embodiment of the present invention may provide a crew capsule contained within the inflated shell.

Another embodiment of the present invention may provide a docking mechanism attached to the crew capsule.

Another embodiment of the present invention may provide an external ridged carbon leading edge mounted on the external shell.

Another embodiment of the present invention may provide a lifting gas pumping system for attitude control. This system may consist of pumps along the tops of the inner lifting gas cells within the inflated outer shell.

Another embodiment of the present invention may provide a combination of chemical/electric thrusters for propulsion as illustrated by FIG. 2(A).

Operation Main Embodiment

The high altitude airship flies from the ground to the station at 90,000 to 140,000 feet. It is the first step in the process. It will carry people and cargo from the ground to the buoyant transfer station.

When this airship leaves the ground, it climbs at a high angle of attack, up to seventy degrees. This puts the vehicle into an upward buoyancy dive. The airfoil cross-section of the wings of the airship convert this upward motion into forward motion. This is the same as a glider converting downward motion into forward motion by means of its wings.

The high altitude airship cannot reach orbit. The orbital airship cannot reach the ground. The buoyant transfer station and docking facility is the connection between the two vehicles.

The orbital airship flies from the buoyant transfer station in the upper atmosphere to orbit. It uses a combination of electric and chemical propulsion to slowly over several days reach orbit. The orbital vehicle is so large that atmospheric drag is significant even in orbit. The propulsion system of the vehicle must remain on in order for the vehicle to remain in orbit. This has an advantage when returning from orbit. No retrorockets are required as in conventional spacecraft. The orbital vehicle turns off its propulsion system and the atmospheric drag slows the vehicle for reentry into the lower atmosphere.

A single lighter than air vehicle cannot be used to reach orbital altitude nor orbital velocity. A vehicle light enough and large enough to achieve orbit cannot survive the high pressure winds and turbulence of the lower atmosphere. One vehicle is required for the lower portion of the journey, another for the upper portion. It the minimum of three lighter-than-air vehicles working together that make this method of reaching Earth's orbit possible.

What is claimed:

1. A method of transportation of cargo from the surface of the Earth, to orbit around the Earth, comprising the minimum steps of:

lifting off the surface of the Earth in an atmospheric airship, docking with a floating docking facility within the upper atmosphere, transferring to a hybrid craft, the hybrid craft both lighter than air and having a shape which generates dynamic lift when the craft is moving through the air, the hybrid craft including propulsion adapted to cause the craft to accelerate, and utilizing the hybrid craft to accelerate to orbital velocity.

2. The method of claim 1 including transportation of cargo from orbit around the Earth, to the surface of the Earth, comprising the minimum steps of:

utilizing the hybrid craft to decelerate from orbital velocity to dock with the floating docking facility within upper atmosphere, and transferring to the atmospheric airship for return to the surface of the Earth.

* * * * *